July 21, 1942.  H. L. POTTER  2,290,484
BEARING
Filed Nov. 6, 1939
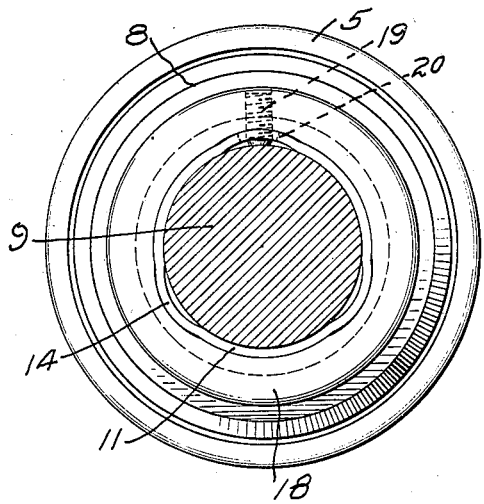
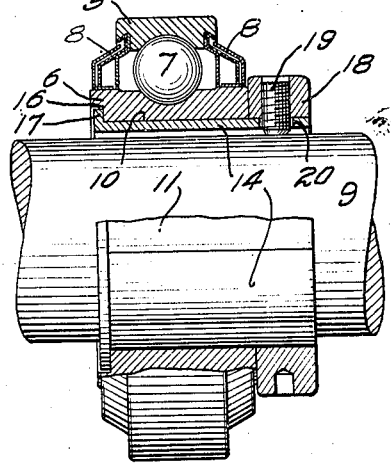
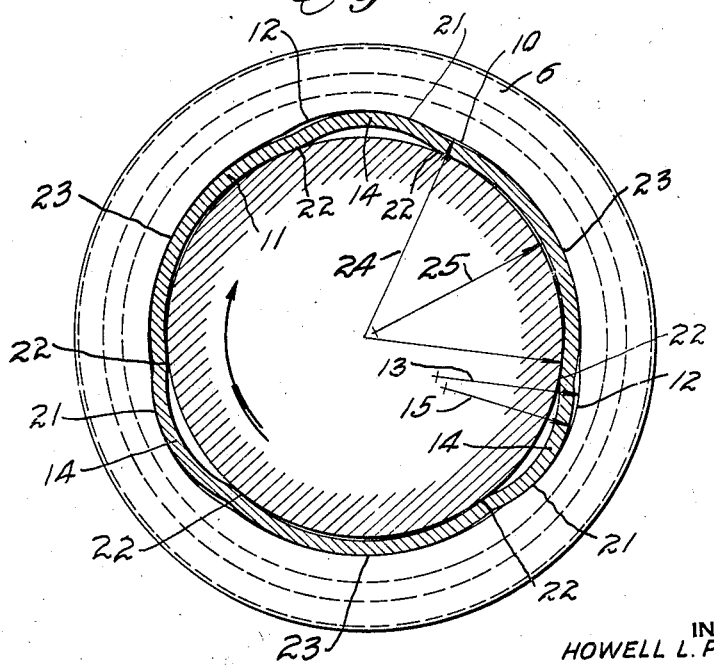
INVENTOR
HOWELL L. POTTER
BY
ATTORNEYS.

Patented July 21, 1942

2,290,484

UNITED STATES PATENT OFFICE 2,290,484

BEARING

Howell L. Potter, New Britain, Conn., assignor to The Fafnir Bearing Company, New Britain, Conn., a corporation of Connecticut Application November 6, 1939, Serial No. 303,092

7 Claims. (Cl. 287—52.09)

My invention relates to a bearing and more particularly to means for holding the inner ring of an anti-friction bearing onto a shaft.

Various devices now in use for holding the inner ring of an anti-friction bearing on a shaft are subject to some disadvantages; for example, adapter bearings involving a split cone sleeve and a conical bore in the inner bearing ring are relatively expensive to manufacture and at times the inner ring gets cocked on the adapter so as to force the inner ring out of round and thus the bearing soon deteriorates and fails. Devices such as set screws, lugs, and the like, for holding the inner ring on the shaft are subject to the disadvantage that such holding means are often unable to withstand the terrific epicyclic forces tending to rotate the ring on the shaft. Various other devices are also open to various objections of a minor or major sort.

It is the general object of my invention to provide improved means for securing the inner ring of an anti-friction bearing to a shaft.

It is a more specific object to provide improved means for securing the inner ring of an anti-friction bearing to a shaft, which includes the provision of a plurality of securing holding surfaces between the ring and shaft.

Another object is to provide an exceedingly simple holding means for the inner ring, which is relatively cheap to manufacture and may be readily applied.

It is another object to provide improved means for holding the inner bearing ring of an anti-friction bearing on a shaft wherein the inner ring is supported at a plurality of more or less symmetrically spaced zones circumferentially of the ring.

Other objects and various features of novelty and invention will be hereinafter pointed out or will become apparent to those skilled in the art.

In the drawing which shows, for illustrative purposes only, a preferred form of the invention—

Fig. 1 is an axial view in elevation of a bearing applied to a shaft and illustrating features of the invention;

Fig. 2 is an edge view in part section of the bearing shown in Fig. 1, parts being broken away to illustrate interior construction;

Fig. 3 is an enlarged detail view of the inner ring in elevation, the sleeve and shaft being shown in section.

In said drawing, the bearing is of a more or less well known construction including an outer ring 5, an inner ring 6, with interposed anti-friction bearing members such as balls 7. Seal devices 8—8 serve to seal the bearing to prevent the ingress of foreign matter and the egress of lubricant.

The invention relates to means for securing the inner ring 6 to the shaft 9. In accordance with my invention the bore 10 in the inner ring is made larger than the shaft by an amount sufficient to freely accommodate a sleeve member 11, which preferably has a rather free fit within the bore of the inner ring and a similar fit on the shaft so as to readily permit assembly of the sleeve with the inner ring and the sliding of the sleeve along the shaft to the desired position. The sleeve 11 and inner ring 6 are provided with an inter-engaging lobe or bulge and lobe or bulge receiving recess so that upon relative rotation of the inner ring and sleeve, the latter will be locked to the shaft and to the inner ring so that the inner ring will be secured to the shaft. The sleeve 11 may be said to have one or more axially extending undulations therein.

In the form shown, the bore 10 of the inner ring is provided with a plurality (in this case three) of bulge receiving recesses 12 of generally arcuate form. Such recesses may be of a radius as indicated by the radius arrow 13. The sleeve 11 is provided with one or more, but preferably three, bulges or lobes 14 which are preferably generally arcuate in form and also preferably formed on a radius 15 shorter than the radius 13. In order to make a more or less unit handling construction, I preferably provide means for holding the sleeve in the inner ring. In the form shown the inner ring at one end is provided with a counterbore 16 and the sleeve 11 has an outwardly directed flange 17 to fit within the counterbore and prevent displacement of the inner ring from the sleeve in one direction. At the opposite end of the sleeve and surrounding the same is a collar 18 which may have bulge receiving recesses corresponding to and in alignment with the recesses 12 of the inner ring. A set screw 19 is threaded radially through the collar 18 and freely passes through an aperture 20 in the sleeve 11. Thus when the set screw is turned up until the nose engages within the aperture 20, the bearing, the sleeve and the collar will all be held in unit handling relationship. The nose of the set screw is designed to engage the shaft as indicated in Figs. 1 and 2 so as to hold the collar on the shaft.

The operation of the device is as follows:

When it is desired to lock the inner ring onto the shaft, the assembled sleeve and inner ring are given a partial relative rotation; for example, as shown in Fig. 3, the inner ring 6 has been slightly rotated relatively to the sleeve 11 in a counterclockwise direction. This partial rotation has the effect of causing one side of the recess 12 to ride up on the corresponding side of the bulge 14 as indicated at 21. The camming action of the side of the recess on the bulge 14 has the effect of forcing the sleeve at the edges of the bulge about as indicated at 22—22 down into forcible frictional engagement with the shaft. The degree of force with which the sleeve at the sides of the bulges is urged into engagement with the shaft depends upon the extent of the partial rotation and the angle of the cam parts at 21. The camming down of the bulges to force the sleeve into forcible engagement with the shaft has also another effect, namely, a tendency to flatten out the bulges and consequently expand the sleeve bore so that beyond the zones 22, for example as shown at 23, the sleeve is forced outwardly into tight frictional engagement with the bore of the inner ring. This will be made clearer upon reference to Fig. 3 wherein the radius arrow 24 indicates the radius of the bore in the inner ring while the radius arrow 25 indicates more or less the radius of the arc which the sleeve takes when it is forced out into engagement with the bore of the inner ring as indicated at 23.

It will be seen that for each bulge there are two spaced apart points or surfaces, namely, 22—22, where the sleeve is caused to forcibly engage the shaft, and also two spaced apart points or surfaces, namely, 21—23 at opposite sides of and spaced from the bulges, where the sleeve is caused to forcibly engage the bore of the inner ring. Therefore, with three lobes or bulges as shown in the drawing, there will be six points of forcible engagement between the shaft and the sleeve and six points of forcible engagement or support between the sleeve and the bore of the inner ring. These points are all symmetrically distributed about the shaft and the points of engagement between the bore of the ring and the sleeve are, in addition, practically equally spaced circumferentially. In describing the operation we have referred to a single bulge. It will be understood, however, that the adjacent bulges act in the same way and the flattening of each bulge contributes its share toward expanding the generally cylindrical portion of the sleeve outwardly into forcible engagement with the bore of the inner ring as at 23.

In order to facilitate the relative rotation of the sleeve and the inner ring, as well as to hold the inner ring against longitudinal displacement on the shaft while locking the inner ring to the shaft, or in case the inner ring should become accidentally unlocked, I prefer to employ some means such as the collar 18 and set screw 20. When the collar 18 is provided with the bulge receiving recesses it is also possible, and in fact preferable, to lock the collar to the sleeve and the sleeve to the shaft by a slight partial rotation between the collar and the sleeve so that the action is substantially the same as between the sleeve and the inner ring. The enlarged aperture 20 in the sleeve permits this partial rotation, even though the set screw extends into its normal place in forcible engagement with the shaft for holding all of the parts against longitudinal displacement thereon. The sleeve 11 has been shown as a continuous sleeve and such a construction is perhaps preferable in that the sleeve may be formed of metal tubing forced into proper shape by means of dies or drawing. The sleeve, however, might be otherwise constructed and might be rolled up from sheet metal, in which case there may be a space between the adjacent edges of the rolled sleeve. It is preferred, however, when the sleeve is rolled up from sheet metal that the edges abut each other so as to form in effect a complete tube or sleeve of circumferentially constant length. The sleeve may be formed of various materials but I have found that a sleeve formed of sheet steel having considerable resiliency is quite satisfactory.

While the invention has been described in considerable detail and a preferred form illustrated, it is to be understood that various changes may be made within the scope of the invention as defined in the appended claims.

I claim:

1. In a means for securing a ring to a shaft, a ring, a sleeve to fit within the bore of said ring and upon the shaft, said sleeve having means for preventing axial disengagement of the ring therefrom in one direction, a collar fitting about said sleeve, together with a set screw in said collar and extending through said sleeve for preventing axial displacement of said ring on said sleeve in the opposite direction, said set screw serving to engage said shaft for holding said collar thereon, said sleeve and said ring having an interfitting generally arcuate bulge and a generally arcuate bulge receiving recess, whereby upon relative rotation between said sleeve and ring said bulge and bulge receiving recess will act as coacting cam surfaces to urge said sleeve into tight fitting engagement with the shaft and the bore of said ring.

2. Means for securing a ring on a shaft, a ring, a sleeve to fit within the bore of the ring and upon the shaft, said sleeve having an outwardly directed arcuate bulge therein, said ring having an outwardly extending generally arcuate bulge receiving recess for receiving the bulge on said sleeve, a collar fitting over said sleeve and having a bulge receiving recess corresponding to the bulge receiving recess in said ring and fitting over the bulge on said sleeve, a set screw in threaded engagement with said collar, said sleeve having an aperture for freely receiving the inner end of said set screw and permitting slight relative rotation between said collar and sleeve, the point of said set screws being in engagement with said shaft for holding said collar thereon against rotation, all for the purpose described.

3. In a means for securing a ring to a shaft, a ring, a radially flexible sleeve interposed between the bore of said ring and the shaft, said sleeve being of circumferentially constant length and said sleeve being normally buckled to reduce the effective diameter thereof, said ring having means to engage a part of said sleeve at the buckled portion thereof to tend to unbuckle the latter and tend to increase the diameter of said sleeve at a point remote from the buckled portion, for the purpose described.

4. In a means for securing a ring member to a shaft member, a ring member, a radially flexible sleeve interposed between the bore of said ring member and the shaft member, said sleeve being normally buckled to reduce the effective diameter thereof, one of said two first mentioned members having means to engage a part of said sleeve at the buckled portion thereof to tend to unbuckle the latter and tend to increase the diameter of said sleeve at a point remote from the buckled portion, for the purpose described.

5. In a means for securing a ring member to a shaft member, a ring member, a radially flexible sleeve interposed between the bore of said ring member and the shaft member, said sleeve being normally buckled at spaced apart zones along its circumference to tend to reduce the circumferential distance along said sleeve between said buckled portions, one of said two first mentioned members having means to engage parts of said sleeve at the buckled portions to tend to unbuckle the latter and thereby tend to increase the circumferential distance along said sleeve between said buckled portions, for the purpose described.

6. In a means for securing a ring member to a shaft member, a ring member, a radially flexible sleeve interposed between the bore of said ring member and the shaft member, said sleeve being normally buckled at a plurality of spaced apart zones whereby the normal diameter of said sleeve is reduced, one of said two first mentioned members having means to engage parts of said sleeve to tend to unbuckle the latter and thereby increase the diameter thereof, for the purpose described.

7. In a means for securing a ring to a shaft, a ring, a sleeve to fit within the bore of said ring and upon the shaft, said sleeve being buckled outwardly at a plurality of spaced apart zones circumferentially thereof whereby the effective diameter of said sleeve is reduced, said ring having a plurality of recesses to receive the buckled portions of said sleeve, said recesses having camming sides to ride up on the buckled portions of said sleeve to tend to unbuckle the same and thereby increase the effective diameter of said sleeve, for the purpose described.

HOWELL L. POTTER.